United States Patent
Ocak et al.

(10) Patent No.: US 10,708,781 B2
(45) Date of Patent: Jul. 7, 2020

(54) METHOD FOR SETTING UP A SECURE CONNECTION BETWEEN LWM2M DEVICES

(71) Applicant: Telefonaktiebolaget LM Ericsson (publ), Stockholm (SE)

(72) Inventors: Mert Ocak, Helsinki (FI); Ari Keränen, Helsinki (FI); Petri Laari, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 16/067,682

(22) PCT Filed: Jan. 27, 2016

(86) PCT No.: PCT/SE2016/050050
§ 371 (c)(1),
(2) Date: Jul. 2, 2018

(87) PCT Pub. No.: WO2017/131564
PCT Pub. Date: Aug. 3, 2017

(65) Prior Publication Data
US 2019/0007836 A1    Jan. 3, 2019

(51) Int. Cl.
*H04W 12/06*  (2009.01)
*H04W 12/00*  (2009.01)
(Continued)

(52) U.S. Cl.
CPC .............. *H04W 12/06* (2013.01); *H04W 4/50* (2018.02); *H04W 4/70* (2018.02);
(Continued)

(58) Field of Classification Search
CPC ........... H04W 12/06; H04W 12/00305; H04W 12/04031; H04W 4/70; H04W 4/50;
(Continued)

(56) References Cited

U.S. PATENT DOCUMENTS 9,124,629 B1 *   9/2015   Bowen ................. H04L 63/168
10,374,800 B1 *  8/2019   Sharifi Mehr ............ H04L 9/14
(Continued)

FOREIGN PATENT DOCUMENTS

WO    WO 2005/034052 A1    4/2005
WO    WO 2015/036785 A1    3/2015

OTHER PUBLICATIONS

Notification of the International Search Report and the Written Opinion of the International Searching Authority for International Application No. PCT/SE2016/050050 dated Oct. 18, 2016.
(Continued)

*Primary Examiner* — Darren B Schwartz
(74) *Attorney, Agent, or Firm* — Sage Patent Group (57) ABSTRACT

A method performed in a client device for setting up a connection with a server device is disclosed. The client device and the server device support a Light Weight Machine to Machine, LWM2M protocol. The method comprises setting up one of a Datagram Transport Layer Security, DTLS, and a Transport Layer Security, TLS, connection with a bootstrap server; performing a bootstrapping procedure with the bootstrap server; receiving, from the bootstrap server, a session ticket and a session key; and setting up the connection to the server device as one of a DTLS and TLS session resumption procedure using the received session ticket and session key. A method in a bootstrap server is also provided, and client device, bootstrap server, computer programs and computer program products are also disclosed.

6 Claims, 6 Drawing Sheets (51) Int. Cl.
  *H04W 12/04* (2009.01)
  *H04W 4/70* (2018.01)
  *H04W 4/50* (2018.01)
  *H04L 29/06* (2006.01)

(52) U.S. Cl.
  CPC ..... *H04W 12/00305* (2019.01); *H04W 12/04* (2013.01); *H04W 12/04031* (2019.01); *H04L 63/0272* (2013.01); *H04L 63/0807* (2013.01); *H04L 63/162* (2013.01); *H04L 63/166* (2013.01); *H04W 12/009* (2019.01); *H04W 12/00518* (2019.01)

(58) Field of Classification Search
  CPC ............... H04W 12/04; H04W 12/009; H04W 12/00518; H04L 63/162; H04L 63/0272; H04L 63/0807; H04L 63/166
  See application file for complete search history.

(56) References Cited

U.S. PATENT DOCUMENTS

| | | | | |
|---|---|---|---|---|
| 2007/0165582 A1* | 7/2007 | Batta | ................... | H04L 63/0823 370/338 |
| 2008/0022374 A1* | 1/2008 | Brown | ................. | H04L 9/3247 726/5 |
| 2010/0250951 A1* | 9/2010 | Ueno | .................... | H04L 9/3263 713/176 |
| 2011/0119744 A1* | 5/2011 | Cho | ....................... | H04L 9/3234 726/6 |
| 2013/0198509 A1* | 8/2013 | Buruganahalli | ...... | H04L 67/146 713/151 |
| 2015/0288679 A1* | 10/2015 | Ben-Nun | .............. | H04L 67/141 726/10 |
| 2016/0277391 A1* | 9/2016 | Choyi | ................... | H04W 12/06 |
| 2016/0315913 A1* | 10/2016 | Lu | ....................... | H04L 65/1069 |

OTHER PUBLICATIONS

"Lightweight Machine to Machine Technical Specification," Candidate Version 1.0, Open Mobile Alliance, Sections 5.1-5.2 and 7, 104 pages, Dec. 10, 2013.

Hummen et al., "Delegation-based Authentication and Authorization for the IP-based Internet of Things," ResearchGate, Section IV, 9 pages, Jun. 2014.

Hummen et al., "Extended DTLS Session Resumption for Constrained Network Environments," Internet Draft, Section 1, 13 pages, Oct. 18, 2013.

Rescorla et al., "Datagram Transport Layer Security," Network Working Group, RFC 4347, 25 pages, Apr. 2006.

Salowey et al., "Transport Layer Security (TLS) Session Resumption without Server-Side State," Network Working Group, RFC 5077, 20 pages, Jan. 2008.

* cited by examiner

METHOD FOR SETTING UP A SECURE CONNECTION BETWEEN LWM2M DEVICES

CROSS REFERENCE TO RELATED APPLICATION

This application is a 35 U.S.C. § 371 national stage application of PCT International Application No. PCT/SE2016/050050, filed on Jan. 27, 2016, the disclosure and content of which is incorporated by reference herein in its entirety.

TECHNICAL FIELD

The technology disclosed herein relates generally to the field of data communication, and in particular to methods and devices for setting up a connection between a client device and a server device, to a client device, a bootstrap server, computer programs and computer program products.

BACKGROUND

Machine to machine (M2M) is a concept encompassing devices, such as for instance sensors and so-called smart devices, using a network for communicating with remote applications of e.g. a server of Internet. Such communication may for instance be for the purpose of monitoring and control. Internet of Things (IoT) refers to a network of objects ("things") with network connectivity, and M2M may be considered an integral part of IoT. Together M2M/IoT covers a huge set of devices that communicate with each other directly and across networks based on various communication or access media, using short range technologies (e.g. Bluetooth or WiFi) as well as long range technologies (e.g. radio access such as 3G or 4G).

LightweightM2M (LWM2M) is a new standard from the Open Mobile Alliance (OMA) that is focused on constrained cellular devices and other M2M devices. The standard defines an efficient device-server interface based on open Internet Engineering Task Force (IETF) standards, i.e. Constrained Application Protocol (CoAP) and Datagram Transport Layer Security (DTLS). The LWM2M enabler includes device management and service enablement for LWM2M devices, and uses a light and compact protocol as well as an efficient resource data model to fit on constrained LWM2M devices.

When a new LWM2M client requests to register to the network, a DTLS connection may be established between the LWM2M client and the bootstrap server, after which a bootstrapping procedure is performed. In the bootstrapping procedure the LWM2M client is configured with required parameters such as security credentials, e.g. private keys, certificates or pre-shared key. Next, the LWM2M client establishes a DTLS connection with the LWM2M server and is then registered to the network and ready to e.g. report measurement values.

LWM2M clients typically have limited processing and storage capabilities and also a limited or very limited power source. The power consumption of the LWM2M client is hence an issue and needs to be considered so as to keep the device functional as long as possible without maintenance. In view of this, there is a need to make the LWM2M client registration to the network as efficient as possible.

SUMMARY

An objective of the present teachings is to address the above mentioned need, and this objective and others are achieved by methods and devices according to the appended independent claims and by the embodiments according to the dependent claims.

The objective is according to an aspect achieved by a method performed in a client device for setting up a connection with a server device. The client device and the server device support a Light Weight Machine to Machine, LWM2M protocol. The method comprises setting up one of a Datagram Transport Layer Security, DTLS, and a Transport Layer Security, TLS, connection with a bootstrap server; performing a bootstrapping procedure with the bootstrap server; receiving, from the bootstrap server, a session ticket and a session key; and setting up the connection to the server device as one of a DTLS and TLS session resumption procedure using the received session ticket and session key.

The method enables an extensive decrease of number of DTLS and TLS handshake messages between the LWM2M client and LWM2M server. This decrease results in reduced power consumption and network use of the LWM2M client, thereby prolonging its operational time.

The objective is according to an aspect achieved by a computer program for a client device for setting up a connection with a server device. The computer program comprises computer program code, which, when executed on at least one processor on the client device causes the client device to perform the method as above.

The objective is according to an aspect achieved by a computer program product comprising a computer program as above and a computer readable means on which the computer program is stored.

The objective is according to an aspect achieved by a client device for setting up a connection with a server device, wherein the client and the server device support a Light Weight Machine to Machine, LWM2M protocol. The client device is configured to: set up one of a Datagram Transport Layer Security, DTLS, and a Transport Layer Security, TLS, connection with a bootstrap server; perform a bootstrapping procedure with the bootstrap server; receive, from the bootstrap server, a session ticket and a session key; and set up the connection to the server device as one of a DTLS and TLS session resumption procedure using the received session ticket and session key.

The objective is according to an aspect achieved by a method performed in a bootstrap server for enabling setting up of a connection between a client device and a server device, wherein the client device and the server device support a Light Weight Machine to Machine, LWM2M protocol. The method comprises setting up one of a Datagram Transport Layer Security, DTLS, connection and a Transport Layer Security, TLS with the client device; performing a bootstrapping procedure with the client device; setting up one of a DTLS and TLS connection to the server device using an identity of the client device; indicating, to the server device desire to use DTLS or TLS session resumption, and receiving a session ticket in response; and sending, to the client device the session ticket and a session key, enabling the client device to set up the connection to the server device as one of a DTLS and TLS session resumption.

The objective is according to an aspect achieved by a computer program for a bootstrap server for enabling setting up of a connection between a client device and a server device. The computer program comprises computer program code, which, when executed on at least one processor on the bootstrap server causes the bootstrap server to perform the method as above.

The objective is according to an aspect achieved by a computer program product comprising a computer program as above and a computer readable means on which the computer program is stored.

The objective is according to an aspect achieved by a bootstrap server for enabling setting up of a connection between a client device and a server device, wherein the client device and the server device support a Light Weight Machine to Machine, LWM2M protocol. The bootstrap server is configured to: set up one of a Datagram Transport Layer Security, DTLS, connection and a Transport Layer Security, TLS with the client device; perform a bootstrapping procedure with the client device; set up one of a DTLS and TLS connection to the server device using an identity of the client device; indicate, to the server device desire to use one of a DTLS and a TLS session resumption, and receiving a session ticket in response; and send, to the client device the session ticket and a session key, enabling the client device to set up the connection to the server device as one of a DTLS and a TLS session resumption.

Further features and advantages of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Constrained Application Protocol (CoAP) is an example of a protocol designed for Internet of Things (IoT) applications in constrained nodes and constrained networks. CoAP provides a request-response based RESTful communication architecture between constrained devices or between constrained devices and nodes in the Internet. CoAP can easily be integrated to World Wide Web (WWW) ("the web") and web services by translating CoAP messages to Hypertext Transfer Protocol (HTTP) messages.

Open Mobile Alliance Device Management (OMA DM) LWM2M protocol is a light and compact device management protocol that is used for managing IoT devices and their resources. LWM2M runs on top of CoAP, which either uses User Datagram Protocol (UDP) or Systems Management Server (SMS) bindings. Hence, LWM2M is compatible with any constrained device which supports CoAP. LWM2M defines three components: LWM2M Client, LWM2M Server and LWM2M Bootstrap Server. In order to maintain communication between these components various LWM2M interfaces are defined, e.g. bootstrapping interface, wherein the LWM2M Bootstrap server sets initial configuration on the LWM2M client. For sake of completeness the three components are described in some more detail in the following.

LWM2M client: It contains several LWM2M objects with several resources. LWM2M server can execute commands on these resources to manage the client, commands such as to read, to delete or to update the resources. LWM2M clients are generally constrained devices, constrained in view of e.g. processing capacity, power source, memory etc.

LWM2M server: It manages LWM2M clients by sending management commands to them.

LWM2M Bootstrap Server: It is used to manage the initial configuration parameters of LWM2M clients during bootstrapping of the LWM2M clients.

The DTLS is a protocol which provides communications privacy for datagram protocols. DTLS is based on TLS (Transport Layer Security) and offers equivalent security measures. Since DTLS is designed for datagram protocols, it is the most used security protocol for CoAP and LWM2M messages. DTLS secure session between the client and the server is established through a handshake process. There are multiple ways for authenticating the nodes in the DTLS handshake, the most common methods being pre-shared key (PSK), x.509 certificates, and Raw Public Key (RPK).

The DTLS connection setup starts with a DTLS handshake procedure, involving exchange of handshaking messages. When the DTLS connection is established, the bootstrap server rewrites the security object of the LWM2M client with information of the corresponding LWM2M server. Next, the LWM2M client establishes a DTLS connection with the LWM2M server by exchanging DTLS handshake messages with the LWM2M server. The DTLS handshake messages can be large, e.g., over 1000 bytes with certificate mode, and a huge overhead in cases where the total number of data messages that the LWM2M client sends is low. The network use of bootstrapping procedure and DTLS handshakes becomes negligible if the LWM2M client sends/receives messages most of the time after registering to the LWM2M server. This is the case e.g. for a temperature sensor reporting every 10 minutes. However, the percentage of the DTLS handshakes is high in LWM2M client's network use, both for number of messages and payload size, when the LWM2M client sends/receives a small number of messages after registering to the LWM2M server or if the LWM2M client needs to be bootstrapped frequently.

Figure 1:
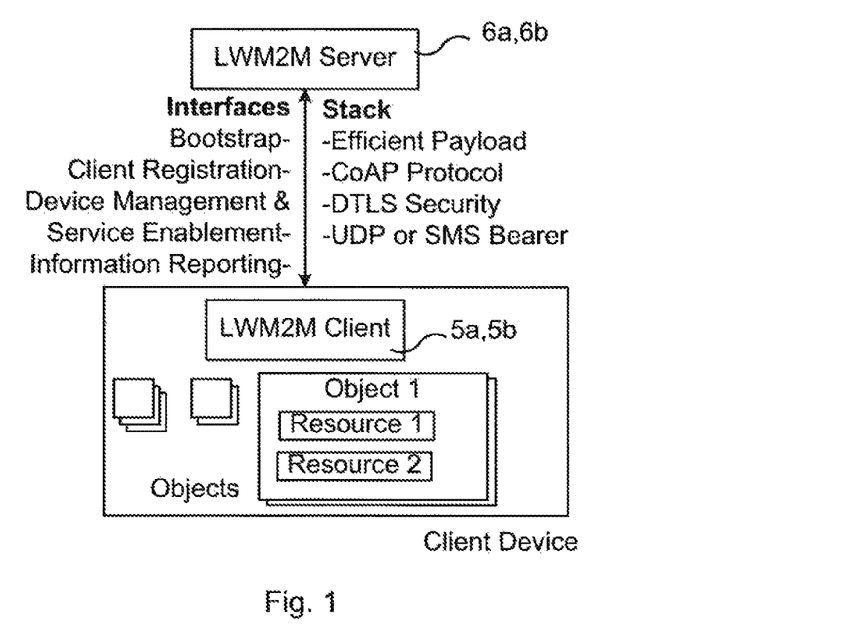
FIG. 1 illustrates a LWM2M architecture.

FIG. 1 illustrates this existing LWM2M architecture comprising a LWM2M server 6a, 6b and a LWM2M client 5a, 5b (sometimes also denoted simply client 5a, 5b herein) running on a LWM2M client device, e.g. a M2M device such as a sensor. To maintain the communication between the LWM2M client 5a, 5b, LWM2M server 6a, 6b and a LWM2M bootstrap server (not explicitly illustrated in FIG. 1), following LWM2M interfaces are defined:

Bootstrapping: LWM2M bootstrap server sets the initial configuration on the LWM2M client 5a, 5b when it bootstraps. There are four different bootstrapping methods: Factory Bootstrap, Bootstrap from Smartcard, Server Initiated Bootstrap and Client Initiated Bootstrap and the present teachings are mainly related to the last mentioned method.

Client Registration: LWM2M client registers to one or more LWM2M servers when the bootstrapping is completed.

Device Management and Service Enablement: LWM2M Server 6a, 6b can send management commands to LWM2M Clients 5a, 5b to perform several management actions on LWM2M resources of the client 5a, 5b. Access control object of the client 5a, 5b determines the set of actions the server can perform.

Information Reporting: As a feature of CoAP Observe-Notify mechanism, LWM2M Clients 5a, 5b can initiate the communication to LWM2M Server 6a, 6b and report information in the form of notifications.

Interfaces between the LWM2M server 6a, 6b and the LWM2M client 5a, 5b thus comprise: bootstrapping, which may be pre-provisioned or client/server initiated; client registration, wherein the client and its objects are registered; device management and service enablement, providing server access to objects or resources; and information reporting, enabling notifications with new resource values.

The LWM2M client 5a, 5b comprises a number of object instances. An object is a collection of resources and a resource is a piece of information that can be read, written or executed. Each resource may have multiple instances (e.g. height H, weight W, length L). Objects and resources are identified by a 16-bit integer while instances are identified by an 8-bit integer. Objects and resources may be accessed with simple Uniform Resource Identifiers (URIs).

A handshaking is an automated process of negotiation that dynamically sets parameters of a communications channel to be established between the LWM2M client 5a, 5b and the LWM2M server 6a, 6b. The handshaking is performed before normal communication over the channel begins, and follows the physical establishment of the channel and precedes normal information transfer.

When a new LWM2M client 5a, 5b requests to register to the network, it needs to be bootstrapped by the bootstrap server. Before starting the bootstrapping process, DTLS connection needs to be established between the client and the bootstrap server by exchanging DTLS handshake messages. When the DTLS connection is established, the bootstrap server rewrites the security object of the LWM2M client with information of the corresponding LWM2M server. This time, the client needs to establish DTLS connection with the LWM2M server by again exchanging DTLS handshake messages. DTLS secure session between the client and the server is established through a handshake process. When a DTLS negotiation is performed once, the client can contact the server at some later point in time and it does not need to re-negotiate the full DTLS connection. This is called DTLS session resumption and it allows faster and lighter connection establishment after one successful DTLS negotiation earlier. To perform DTLS resumption, the SessionTicket extension of TLS can be used by the client 5a, 5b and the server 6a, 6b.

Hence, the LWM2M client needs to perform two separate DTLS handshake procedures for the LWM2M server to manage it. The inventors of the present invention have realized a way of improving the above described LWM2M client registration towards the network, and in particular a way to alleviate the LWM2M client 5a, 5b from having to do these separate handshake procedures.

Briefly, an enhanced procedure is proposed herein, for decreasing the number of DTLS handshakes performed by a LWM2M client 5a, 5b in bootstrapping towards LWM2M bootstrap server and client registration towards LWM2M server 6a, 6b. The LWM2M client 5a, 5b and a LWM2M bootstrap server perform the normal bootstrapping procedure after setting up a secure DTLS connection. After bootstrapping, DTLS session information established between the LWM2M client 5a, 5b and the LWM2M bootstrap server is also exchanged between the LWM2M bootstrap server and LWM2M server 6a, 6b i.e. LWM2M bootstrap server sets up the state for the LWM2M client 5a, 5b on LWM2M server 6a, 6b. Hence, the LWM2M client 5a, 5b does not need to perform another full DTLS handshake procedure towards the LWM2M server since it can do a DTLS session resumption with the LWM2M server 6a, 6b. The resumption will establish the secure DTLS connection between the LWM2M client 5a, 5b and the LWM2M server 6a, 6b with a minimum number of DTLS handshake messages.

Figure 2:
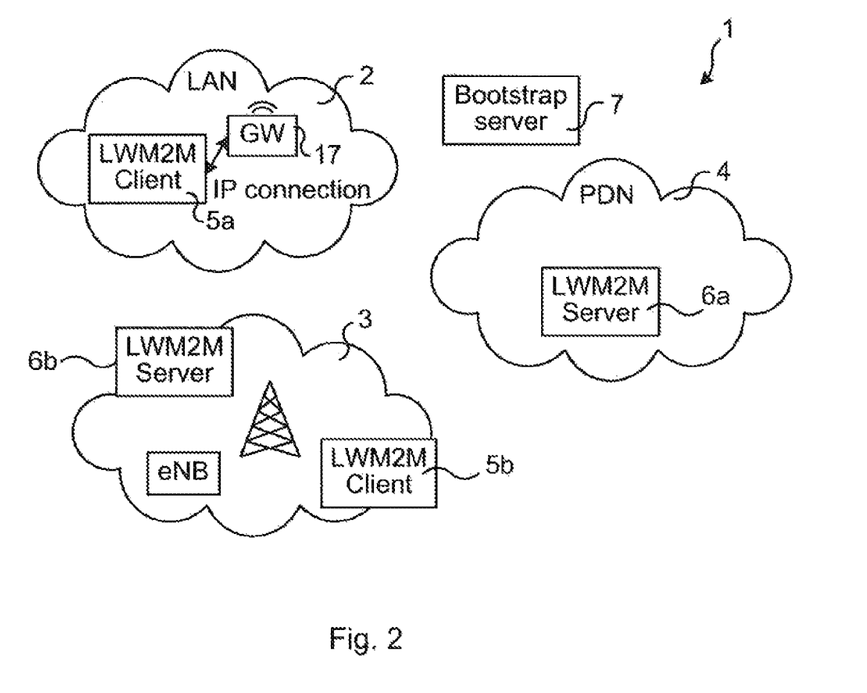
FIG. 2 illustrates an environment in which embodiments according to the present teachings may be implemented.

FIG. 2 illustrates an environment in which embodiments according to the present teachings may be implemented. FIG. 2 illustrates a system 1 comprising a number of LWM2M clients 5a, 5b and LWM2M servers 6a, 6b. The LWM2M client 16 may be implemented in hardware and/or software. The LWM2M clients 5a, 5b communicate with the LWM2M servers 6a, 6b, involving e.g. the interfaces described with reference to FIG. 1. The LWM2M client 5a may communicate with the LWM2M server 6a may over e.g. a Local Area Network (LAN) 2 using an IP (Internet Protocol) connection to an IP gateway 8 thereof. The LWM2M server 6a may be provided in the LAN 2 or in a packet data network (PDN) 4 such as Internet. As another example, the LWM2M client 5b may communicate with the LWM2M server 6b over e.g. a telecommunications network (illustrated in a simplified manner in FIG. 2 and indicated at reference numeral 3).

The LWM2M servers 6a, 6b may be implemented in hardware and/or software. The LWM2M servers 6a, 6b may comprise M2M applications accessible by the LWM2M clients 5a, 5b. A bootstrap server 7 is also illustrated, with which the LWM2M clients 5a, 5b may perform bootstrapping procedures.

Figure 3:
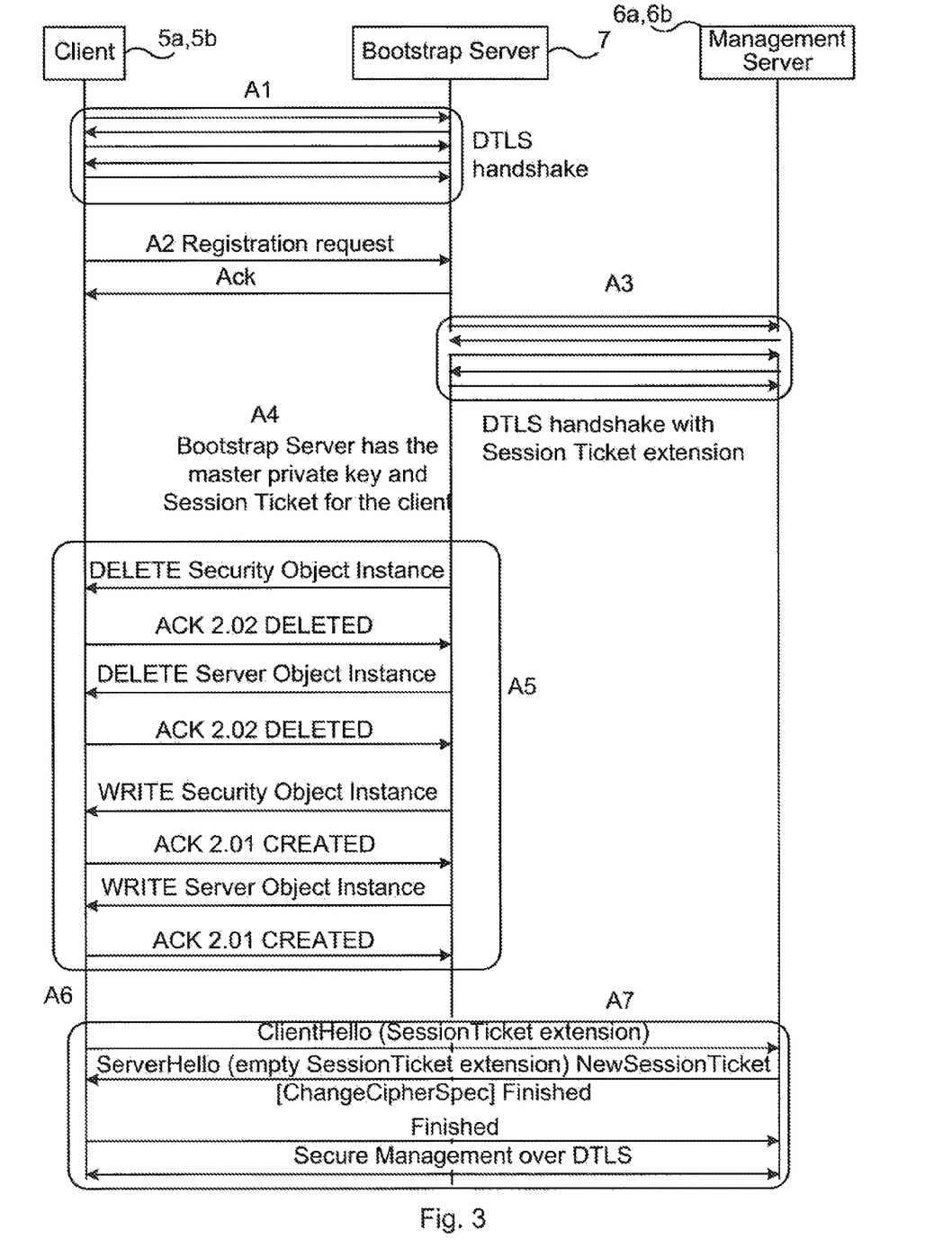
FIG. 3 is a signaling diagram illustrating embodiments according to the present teachings.

FIG. 3 is a signaling diagram illustrating embodiments according to the present teachings. An enhanced way is, in various embodiments, provided for handing over DTLS session information obtained between the LWM2M bootstrap server 7 (also denoted simply bootstrap server) and the LWM2M server 6a, 6b (also denoted simply server device or server. In the FIG. 3, the server is named Management Server). The obtained DTLS session information is handed over from the LWM2M bootstrap server 7 to the LWM2M client device 5a, 5b (also denoted simply client device or client). Various embodiments will be described in the following with reference first to FIG. 3.

Box A1: When the LWM2M client 5a, 5b is turned on, it starts a client-initiated bootstrapping procedure with the bootstrap server 7. A DTLS connection between the LWM2M client 5a, 5b and bootstrap server 7 is established before starting the bootstrapping procedure. The communication exchange in the DTLS connection set up is schematically indicated by the arrows within box A1.

Arrow A2: the client 5a, 5b initiates the bootstrapping procedure by sending a registration request to the bootstrap server 7.

Box A3: The bootstrap server 7 creates a DTLS connection also to the LWM2M server 6a, 6b using client's identity after receiving the bootstrap request (arrow A2) from the client 5a, 5b. In this exemplary case, the client 5a, 5b delegates its identity to the bootstrap server 7 during the bootstrap phase (/registration request). If the bootstrap server 7 is aware of (e.g. provided with) the client's identity in advance, the bootstrap server 7 can perform DTLS handshake with the LWM2M server 6a, 6b using the LWM2M client's identity even before the LWM2M client 5a, 5b wakes up.

Still in box A3:

After the bootstrap server 7 makes the DTLS connection to the LWM2M server 6a, 6b, it indicates with the ClientHello message that it wants to use SessionTicket TLS extension (empty Session Ticket extension, reference is made to RFC 5077, section 3.2 Session Ticket TLS extension).

A4: The LWM2M server 6s, 6b supports SessionTicket extension, and the bootstrap server 7 will now have a SessionTicket and a master private key for the LWM2M client 5a, 5b to be used for making DTLS session resumption. This is indicated at A4. The master key may, in case of DTLS, be the DTLS connection's private key, i.e. the key for that specific DTLS connection (or session).

Box A5: After obtaining the SessionTicket for the LWM2M client 5a, 5b, the bootstrap server 7 writes this SessionTicket to a security object of the LWM2M client 5a, 5b by performing a LWM2M WRITE operation during the bootstrap procedure (possibly preceded by a DELETE security object instance operation, as indicated in box A5).

The LWM2M client 5a, 5b needs to know the master secret key obtained in communication between the bootstrap server 7 and the LWM2M server 6a, 6b. The master key (also denoted session key) is therefore handed over to the LWM2M client 5a, 5b by the bootstrap server 7. The LWM2M client 5a, 5b may store the session ticket along with the master key and other parameters. Since the connection between the bootstrap server 7 and the LWM2M client 5a, 5b is secured with DTLS (by flow executed in Box A1), the master key will be kept secret during the transmission.

A6: The bootstrap procedure between the LWM2M client 5a, 5b and the bootstrap server 7 is now completed.

Box A7: The LWM2M client 5a, 5b now has the master private key and session ticket and is able to initiate communication with the LWM2M server 6a, 6b by using DTLS session resumption procedure using the session ticket and session key (i.e. the master private key). Still with reference to box A7:

When the bootstrap process is finished, the LWM2M client 5a, 5b needs to establish the DTLS connection to LWM2M server 6a, 6b by using DTLS session resumption. To do so, the LWM2M client 5a, 5b sends a ClientHello message which includes the SessionTicket in the SessionTicket extension.

The LWM2M server 6a, 6b decrypts the received ticket, verifies its validity and uses the ticket's contents to resume the session. At this stage, both the LWM2M client 5a, 5b and LWM2M server 6a, 6b behave as if there have been a DTLS connection earlier and tries to resume such earlier session. However, the LWM2M client 5a, 5b and LWM2M server 6a, 6b in fact communicate with each other for the first time.

Once the LWM2M server 6a, 6b verifies the ticket, it sends Finished response to the LWM2M client 5a, 5b. Thus, secure DTLS connection is established between the LWM2M client 5a, 5b and the LWM2M server 6a, 6b with minimum number of handshake messages. The LWM2M server 6a, 6b can now securely manage the LWM2M client 5a, 5b over the DTLS connection between them.

In the above described embodiments a trusted relation between LWM2M bootstrap server 7 and the LWM2M server 6a, 6b is assumed to exist. Although these two servers 7; 6a, 6b are generally in trusted networks and already have some sort of trust relation between each other to bootstrap the LWM2M client 5a, 5b, such trust relation may not be feasible in all implementation scenarios.

This solution requires all involved parties i.e. LWM2M client 5a, 5b, bootstrap server 7 and LWM2M server 6a, 6b to support TLS SessionTicket extension.

In the embodiments described above with reference to FIG. 3, the bootstrap server 7 uses the LWM2M client's identity for establishing the DTLS connection to the LWM2M server 6a, 6b, from where the SessionTicket is obtained. In some embodiments, if it is not possible for the bootstrap server 7 to use the LWM2M client's identity (e.g., due to security concerns with the bootstrap server 7), could have a specific extension for DTLS could be provided that allows the LWM2M client 5a, 5b to generate a new identity that can be used only for delegation and obtaining a session ticket. Such specific extension for DTLS could, for example, be implemented as a new message type in the DTLS handshake or as a new field in an existing message's body. When the session ticket is then used, the LWM2M client 5a, 5b would need to prove that it is indeed the one for which the session ticket was created for. For instance, if the originally delegated identity was signed by the LWM2M client's private key that key could be used to check that this is the intended LWM2M client 5a, 5b. It is noted that this identity check, i.e. checking if the client has the correct identification, may be done both by the bootstrap server 7 and the LWM2M server 6a, 6b. However, since the identity generation is performed mainly due to security concerns with the bootstrap server 7, the LWM2M server 6a, 6b should be the primary one checking the generated identity. The LWM2M server 6, 6b can confirm the identity e.g. by checking if the identity was generated by the LWM2M client's 5a, 5b private key and/or certificate.

An advantage of the mechanism disclosed herein is expected to be more obvious in use cases where the constrained LWM2M client 5a, 5b communicates with the LWM2M server 6a, 6b only with very few messages after the bootstrapping. In such use cases, the percentage of DTLS handshake messages in connections from the LWM2M client 5a, 5b to both bootstrap server 7 and LWM2M server(s) 6a, 6b are high in the LWM2M client's overall network use. Hence, handing over some part of that DTLS handshake to non-constrained bootstrap servers decreases the network use by the constrained LWM2M device, resulting in less power consumption and prolonged operating time.

Figure 4:
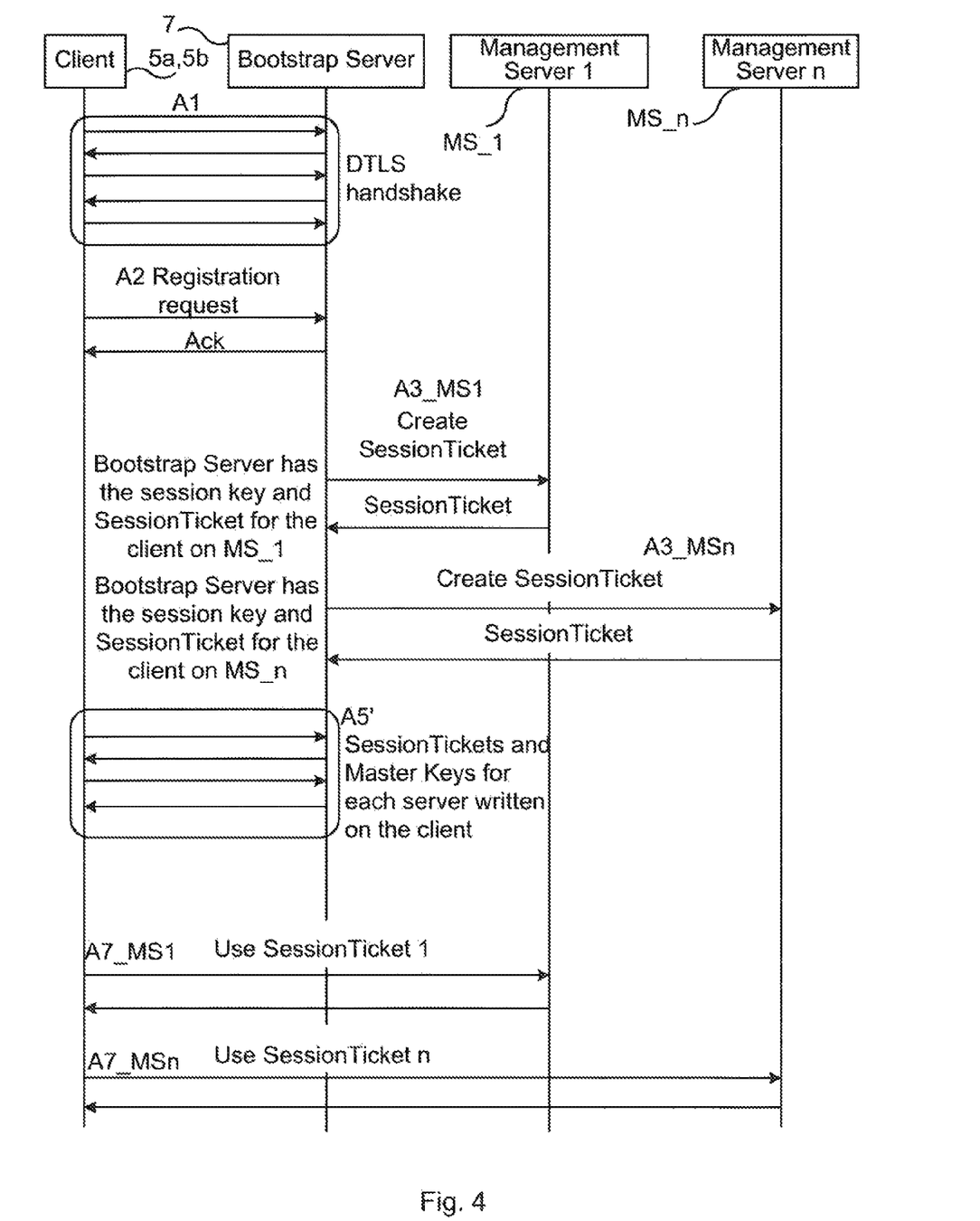
FIG. 4 is a signaling diagram illustrating embodiments according to the present teachings.

FIG. 4 is a signaling diagram illustrating embodiments according to the present teachings. An exemplary use case for the above mechanism is the case in which a single LWM2M client 5a, 5b needs to be managed by several LWM2M servers (denoted MS_1 and MS_n, respectively in the figure, MS for Management Server) such as a building with multiple owners in which a LWM2M client installed in the building will need to be managed by all the owners. In this scenario, as in the scenario for a single LWM2M server 6a, 6b, the LWM2M client 5a, 5b and the bootstrap server 7 sets up a DTLS connection (Box A1), the client 5a, 5b initiates the bootstrapping procedure by sending a registration request to the bootstrap server 7 (arrow A2). The description of Box A1 and Arrow A2 provided in relation to FIG. 3 is applicable also here and is not repeated.

In this embodiment, the bootstrap server 7 may then create DTLS sessions with all the LWM2M servers on behalf of the LWM2M client 5a, 5b and obtain the master private keys (session keys) and SessionTickets (arrows A3_MS1 and A3MSn of FIG. 4) from each respective LWM2M servers MS_1, MS_n.

At box A5' the bootstrap server 7 then writes this information on the client e.g. on different LWM2M Server Object instances. In such way, the LWM2M client 5a, 5b uses different secrets with different LWM2M servers and each secret kept securely on the LWM2M client 5a, 5b. Box A5' corresponds to Box A5 described with reference to FIG. 3, but entails a respective set of session key and session ticket for use in session resumption to the respective LWM2M server.

At arrows A7_MS1, A7_MSn, the LWM2M client 5a, 5b uses the session key and session ticket for LWM2M server MS_1 for establishing a connection to the LWM2M server using a session resumption procedure. The description of arrow A7 corresponds to arrows A7_MS1 and A7_MSn provided with reference to FIG. 3 is applicable also here and is not repeated.

The number of DTLS handshake messages the LWM2M client 5a, 5b would need to perform decreases drastically in this use case since the LWM2M client 5a, 5b avoids performing full DTLS handshake with multiple LWM2M servers.

The features and embodiments that have been described may be combined in various ways, examples of which are given in the following with reference to FIGS. 5-9.

Figure 5:
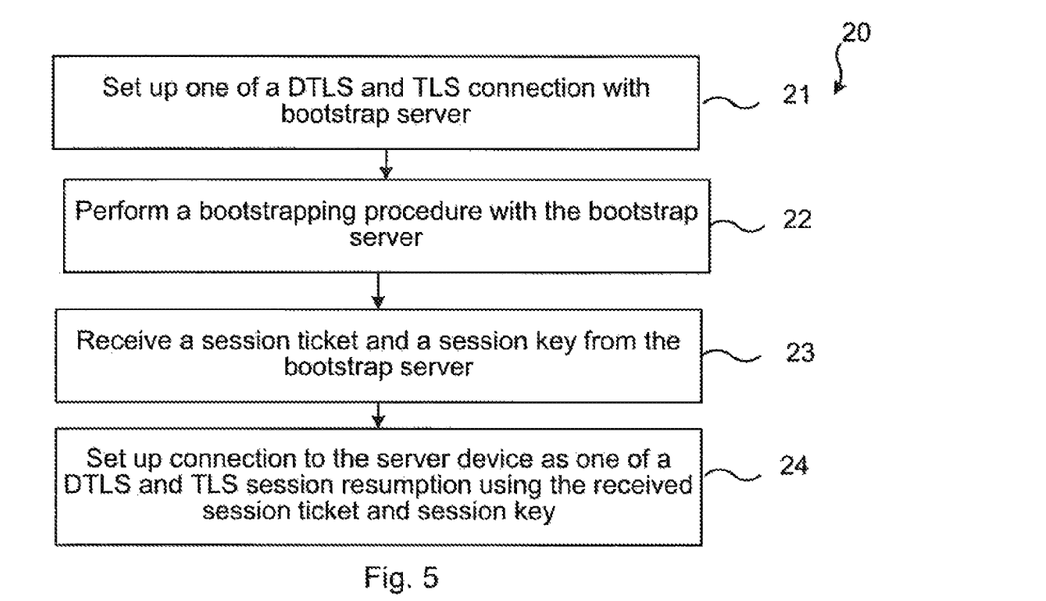
FIG. 5 illustrates a flow chart over steps of a method in a client device in accordance with the present teachings.

FIG. 5 illustrates a flow chart over steps of a method in a client device in accordance with the present teachings.

A method 20 performed in a client device 5a, 5b for setting up a connection with a server device 6a, 6b is provided. The client device 5a, 5b and the server device 6a, 6b both support a Light Weight Machine to Machine, LWM2M protocol. The method 20 comprises setting up 21 one of a Datagram Transport Layer Security, DTLS, and a Transport Layer Security, TLS, connection with a bootstrap server 7. In some embodiments, TLS protocol is used, while in others DTLS protocol is used. DTLS protocol is based on the TLS protocol, and both provide communication security between the communicating endpoints. LWM2M is defined for DTLS and there are specifications for CoAP over TLS, and LWM2M over TLS is therefore foreseen as an option.

The method 20 comprises performing 22 a bootstrapping procedure with the bootstrap server 7. This may be a conventional bootstrapping procedure, as has been described earlier, e.g. in relation to FIG. 3. In some embodiments, the client device 5a, 5b may indicate that the bootstrap server 7 is allowed to act on behalf of the client device 5a, 5b, which is a new feature that may be introduced in a currently used bootstrapping procedure.

The method 20 comprises receiving 23, from the bootstrap server 7, a session ticket and a session key.

The method 20 comprises setting up 24 the connection to the server device 6a, 6b as a one of a DTLS and a TLS session resumption procedure using the received session ticket and session key. The client device 5a, 5b is hence alleviated from the need to perform also a handshake procedure with the server device 6a, 6b, but simply uses a session resumption procedure. If the connection is a DTLS connection, then the setting up 24 of the connection to the server device is a DTLS session resumption procedure. If the connection is a TLS connection, then the setting up 24 of the connection to the server device is a TLS session resumption procedure.

The method 20 brings about a number of advantages. For instance, the method enables a reduction in the number of DTLS handshakes in LWM2M bootstrapping and client registration phases whereby the number of messages sent by a constrained LWM2M client is highly decreased. The LWM2M client 5a, 5b is typically a constrained device, and such decrease is important as it results in reduced power consumption and network use of the client 5a, 5b. This in turn prolongs the operational time of the LWM2M client 5a, 5b, e.g. by saving battery life time for battery operated LWM2M clients.

These advantages of the method are more pronounced in use cases where the number of messages that the client 5a, 5b sends and/or receives is very low after registration to the LWM2M server or where the client 5a, 5b needs to be bootstrapped frequently. As an example, a typical DTLS handshake process requires 15 packets to be exchanged between the client and the server i.e. the client sends IP packets in 7 uplink and 8 downlink connections to the server exchanging a total of around 1.2-1.5 kilobytes (KB). Considering that the typical IoT message is around 40-60 bytes including the DTLS overhead, the method 20 according to the present teachings decreases this large amount of handshake messages at least by half. The amount of connections and bytes saved is significant compared to typical IoT message size.

In an embodiment, the method 20 comprises indicating, during the bootstrapping procedure, that the bootstrap server 7 is to set up one of the DTLS and TLS connection to the server device 6a, 6b on behalf of the client device 5a, 5b.

In some embodiments, the indicating comprises delegating an identity of the client device 5a, 5b to the bootstrap server 7. This has been described earlier, e.g. in relation to FIG. 3.

In other embodiments, the method 20 comprises generating a temporary identity of the client device 5a, 5b and using the generated temporary identity in the indicating. The generated temporary identity may be implemented such as to be usable only for delegation in order for the bootstrap server 7 to provide the client device 5a, 5b with a session ticket for performing a session resumption procedure as initial contact with the server device 6a, 6b. This has been described earlier, e.g. in relation to FIG. 4, and provides an advantage in that an increased privacy is obtained as the bootstrap server 7 is not given the actual client device 5a, 5b identity.

Figure 6:
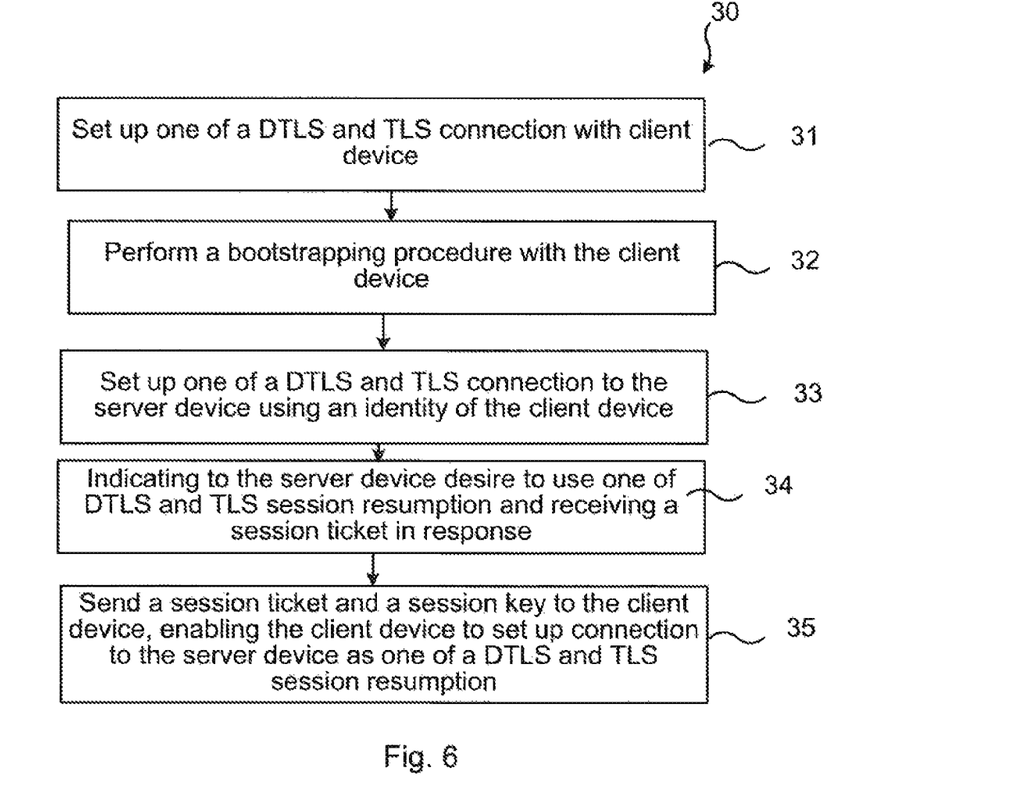
FIG. 6 illustrates a flow chart over steps of a method in a bootstrap server in accordance with the present teachings.

FIG. 6 illustrates a flow chart over steps of a method in a bootstrap server in accordance with the present teachings.

A method 30 is provided performed in a bootstrapping server 7 for enabling setting up of a connection between a client device 5a, 5b and a server device 6a, 6b. The client device 5a, 5b and the server device 6a, 6b support a Light Weight Machine to Machine, LWM2M protocol. The method 30 comprises:

setting up 31 one of a Datagram Transport Layer Security, DTLS, connection and a Transport Layer Security, TLS with the client device 5a, 5b, performing 32 a bootstrapping procedure with the client device 5a, 5b, setting up 33 one of a DTLS and a TLS connection to the server device 6a, 6b using an identity of the client device 5a, 5b, indicating 34, to the server device 6a, 6b desire to use one of DTLS and TLS session resumption, and receiving a session ticket in response, and sending 35, to the client device 5a, 5b the session ticket and a session key, enabling the client device 5a, 5b to set up the connection to the server device 6a, 6b as one of a DTLS and a TLS session resumption.

It is noted that in some embodiments a DTLS connection is used while in other embodiments, a TLS connection is used. If the connection is a DTLS connection, then the setting up of the connection to the server device is a DTLS session resumption procedure. If the connection is a TLS connection, then the setting up of the connection to the server device is a TLS session resumption procedure.

In an embodiment, the identity of the client device 5a, 5b comprises a temporary identity usable only for delegation and acquiring of one of a DTLS and TLS session resumption ticket.

In an embodiment, the method 20 comprises receiving, during the bootstrapping procedure, and indication that the bootstrap server 7 is to set up one of the DTLS and the TLS connection to the server device 6a, 6b on behalf of the client device 5a, 5b.

Figure 7:
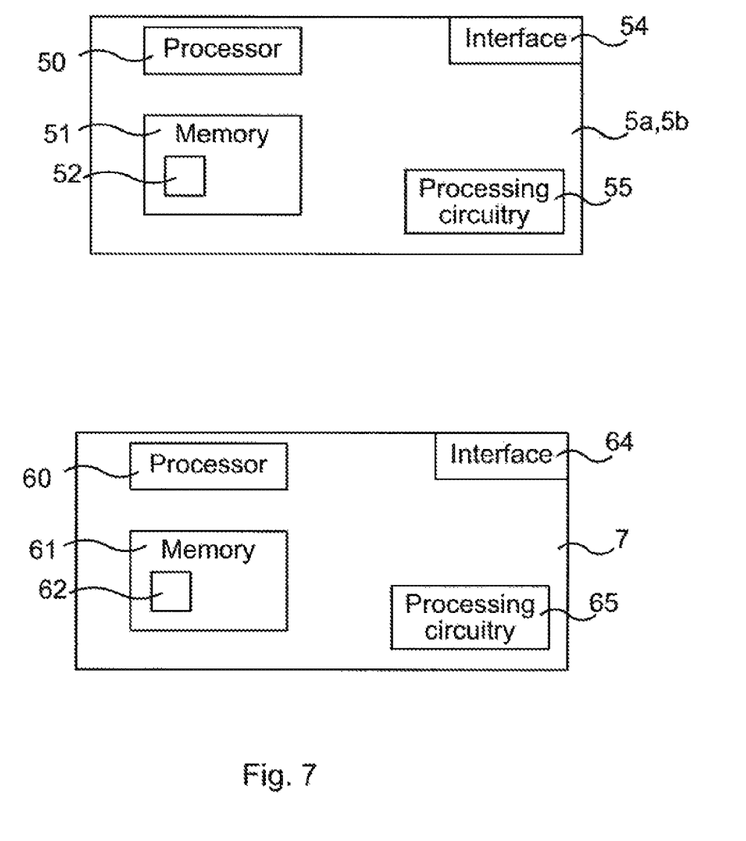
FIG. 7 illustrates schematically a client device, a bootstrap server and means for implementing embodiments according to the present teachings.

FIG. 7 illustrates schematically a client device, a bootstrap server and means for implementing embodiments in accordance with the present teachings. FIG. 7 illustrates a client device 5a, 5b and a bootstrap server 7, in which methods according to the present teachings may be implemented. The client device 5a, 5b and a bootstrap server 7 each comprises a processor 50, 60 comprising any combination of one or more of a central processing unit (CPU), multiprocessor, microcontroller, digital signal processor (DSP), application specific integrated circuit etc. capable of executing software instructions stored in a memory 51, 61 which can thus be a computer program product 51, 61. The processor 50 of the client device 5a, 5b can be configured to execute any of the various embodiments of the method 20 for instance as described in relation to FIG. 5. The processor 60 of the bootstrap server 7 can be configured to execute any of the various embodiments of the method 30 for instance as described in relation to FIG. 6.

The memory 51, 61 can be any combination of read and write memory (RAM) and read only memory (ROM), Flash memory, magnetic tape, Compact Disc (CD)-ROM, digital versatile disc (DVD), Blu-ray disc etc. The memory 51, 61 may also comprise persistent storage, which, for example, can be any single one or combination of magnetic memory, optical memory, solid state memory or even remotely mounted memory.

Each of the client device 5a, 5b and a bootstrap server 7 comprises an interface 54, 64 for communication with other devices. The interface 54 of the client device 5a, 5b may, for instance, comprise an interface e.g. protocol stacks etc., for communication with the bootstrap server 7, and also an interface for communication with the server device 6a, 6b. Examples of such interfaces have, for instance, been given in relation to description of FIG. 1.

The interface 64 of the bootstrap server 7 may, for instance, an interface, e.g. protocol stacks etc., for communication with the client device 5a, 5b as well as with the server device 6a, 6b.

Each of the client device 5a, 5b and a bootstrap server 7 may comprise additional processing circuitry, schematically indicated at reference numerals 55, 65, respectively, for implementing the various embodiments according to the present teachings.

A client device 5a, 5b is provided for setting up a connection with a server device 6a, 6b. The client device 5a, 5b and the server device 6a, 6b support a Light Weight Machine to Machine, LWM2M protocol. The client device 5a, 5b is configured to:

set up a Datagram Transport Layer Security, DTLS, or a Transport Layer Security, TLS, connection with a bootstrap server 7, perform a bootstrapping procedure with the bootstrap server 7, receive, from the bootstrap server 7, a session ticket and a session key, and set up the connection to the server device 6a, 6b as one of a DTLS and a TLS session resumption procedure using the received session ticket and session key.

Advantages corresponding to the advantages described for the method 20 are obtained also for the client device 5a, 5b.

In an embodiment, the client device 5a, 5b is configured to indicate, during the bootstrapping procedure, that the bootstrap server 7 is to set up one of the DTLS and TLS connection to the server device 6a, 6b on behalf of the client device 5a, 5b.

In an embodiment, the client device 5a, 5b is configured to indicate by delegating an identity of the client device 5a, 5b to the bootstrap server 7.

In an embodiment, the client device 5a, 5b is configured to generate a temporary identity of the client device 5a, 5b and to use the generated temporary identity in the indicating.

The client device 5a, 5b may be configured to perform the above steps e.g. by comprising one or more processors 50 and memory 51, the memory 51 containing instructions executable by the processor 50, whereby the client device 5a, 5b is operative to perform the steps.

In one embodiment thus, a client device 5a, 5b is provided for setting up a connection with a server device 6a, 6b. The client device 5a, 5b and the server device 6a, 6b support a Light Weight Machine to Machine, LWM2M protocol. The client device 5a, 5b comprises one or more processors 50 and memory 51, the memory 51 containing instructions executable by the processor 50, whereby the client device 5a, 5b is operative to:

set up a Datagram Transport Layer Security, DTLS, or a Transport Layer Security, TLS, connection with a bootstrap server 7, perform a bootstrapping procedure with the bootstrap server 7, receive, from the bootstrap server 7, a session ticket and a session key, and set up the connection to the server device 6a, 6b as one of a DTLS and TLS session resumption procedure using the received session ticket and session key.

With reference still to FIG. 7, a bootstrap server 7 is also provided for enabling setting up of a connection between a client device 5a, 5b and a server device 6a, 6b. The client device 5a, 5b and the server device 6a, 6b support a Light Weight Machine to Machine, LWM2M protocol. The bootstrap server 7 is configured to:

set up one of a Datagram Transport Layer Security, DTLS, connection and a Transport Layer Security, TLS with the client device 5a, 5b, perform a bootstrapping procedure with the client device 5a, 5b, set up one of a DTLS and TLS connection to the server device 6a, 6b using an identity of the client device 5a, 5b, indicate, to the server device 6a, 6b desire to use one of DTLS and TLS session resumption, and receiving a session ticket in response, and send, to the client device 5a, 5b the session ticket and a session key, enabling the client device 5a, 5b to set up the connection to the server device 6a, 6b as one of a DTLS and TLS session resumption.

In an embodiment, the identity of the client device 5a, 5b comprises a temporary identity usable only for delegation and acquiring one of a DTLS and TLS session resumption ticket.

In an embodiment, the bootstrap server 7 is configured to receive, during the bootstrapping procedure, and indication that the bootstrap server 7 is to set up one of the DTLS and TLS connection to the server device 6a, 6b on behalf of the client device 5a, 5b.

The bootstrap server 7 may be configured to perform the above steps e.g. by comprising one or more processors 60 and memory 61, the memory 61 containing instructions executable by the processor 60, whereby the bootstrap server 7 is operative to perform the steps.

In one embodiment thus, a bootstrap server 7 is provided for enabling setting up of a connection between a client device 5a, 5b and a server device 6a, 6b. The client device 5a, 5b and the server device 6a, 6b support a Light Weight Machine to Machine, LWM2M protocol. The bootstrap server 7 comprises one or more processors 60 and memory 61, the memory 61 containing instructions executable by the processor 60, whereby the bootstrap server 7 is operative to:

set up one of a Datagram Transport Layer Security, DTLS, connection and a Transport Layer Security, TLS with the client device 5a, 5b, perform a bootstrapping procedure with the client device 5a, 5b, set up one of a DTLS and TLS connection to the server device 6a, 6b using an identity of the client device 5a, 5b, indicate, to the server device 6a, 6b desire to use one of a DTLS and TLS session resumption, and receiving a session ticket in response, and send, to the client device 5a, 5b the session ticket and a session key, enabling the client device 5a, 5b to set up the connection to the server device 6a, 6b as one of a DTLS and TLS session resumption.

The present teachings also encompass a computer program 52 for a client device 5a, 5b for setting up a connection with a server device 6a, 6b and a computer program 62 for a bootstrap server 7 for enabling setting up of a connection between a client device 5a, 5b and a server device 6a, 6b. The computer program 52 for the client device 5a, 5b comprises computer program code, which, when executed on at least one processor on the client device 5a, 5b, causes the client device 5a, 5b to perform the method 20 according to any of the described embodiments (e.g. as described in relation to FIG. 5). The computer program 62 for the bootstrap server 7 comprises computer program code, which, when executed on at least one processor on the bootstrap server 7, causes the bootstrap server 7 to perform the method 30 according to any of the described embodiments (e.g. as described in relation to FIG. 6).

The present teachings also encompasses computer program products 51, 61 comprising a computer program 52, 62 for implementing the embodiments of the methods as described, and a computer readable means on which the computer programs 52, 62 are stored. The computer program product, or the memory, thus comprises instructions executable by the processor 50, 60. Such instructions may be comprised in a computer program, or in one or more software modules or function modules. The computer program product 51, 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 8:
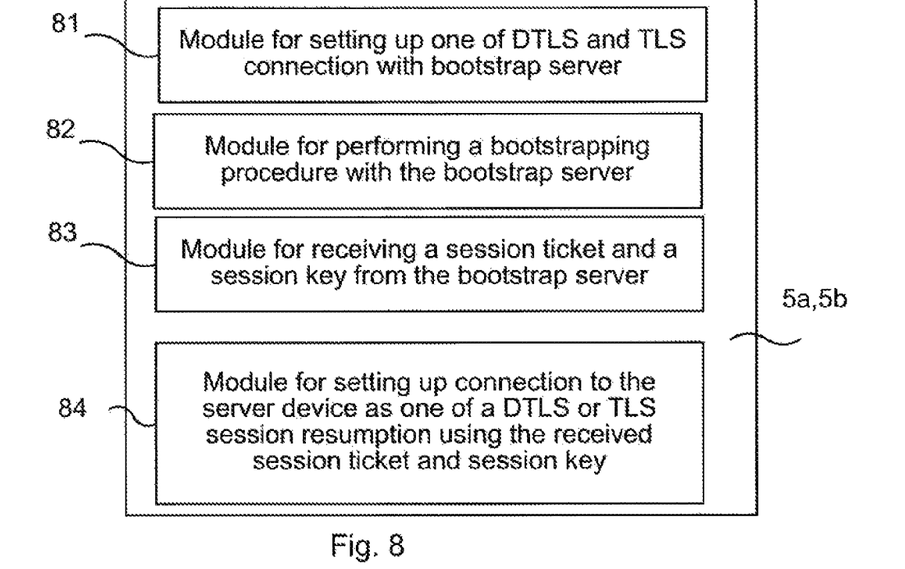
FIG. 8 illustrates a client device comprising function modules/software modules for implementing embodiments according to the present teachings.

FIG. 8 illustrates a client device comprising function modules/software modules for implementing methods of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 in the client device 5a, 5b that has been described.

A client device is provided for setting up a connection with a server device. The client device and the server device support a Light Weight Machine to Machine, LWM2M protocol. The client device comprises a first module 81 for setting up a Datagram Transport Layer Security, DTLS, or a Transport Layer Security, TLS, connection with a bootstrap server. The first module may, for instance, comprise an interface device and/or a protocol (e.g. interface 53 described with reference to FIG. 7), and/or processing circuitry adapted to send/receive messages to/from the bootstrap server.

The client device comprises a second module 82 for performing a bootstrapping procedure with the bootstrap server. Such second module 82 may comprise processing circuitry adapted for such bootstrapping procedure, and/or an interface device.

The client device comprises a third module 83 for receiving, from the bootstrap server, a session ticket and a session key. Such third module 83 may, for instance, comprise receiving circuitry and/or processing circuitry.

The client device comprises a fourth module 84 for setting up the connection to the server device as one of a DTLS and a TLS session resumption procedure using the received session ticket and session key. Such fourth module 84 may comprise processing circuitry adapted for performing such setting up of the connection.

Figure 9:
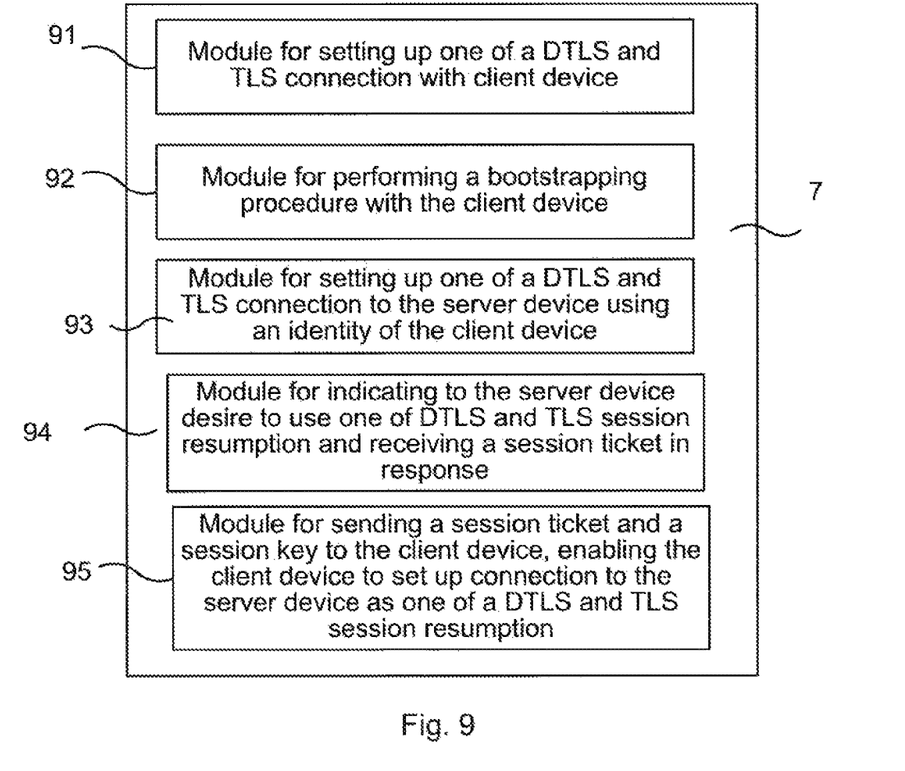
FIG. 9 illustrates a bootstrap server comprising function modules/software modules for implementing embodiments according to the present teachings.

FIG. 9 illustrates a bootstrap server comprising function modules/software modules for implementing methods of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 in the bootstrap server 7 that has been described.

A bootstrap server is provided for enabling setting up of a connection between a client device and a server device, wherein the client device and the server device support a Light Weight Machine to Machine, LWM2M protocol. The bootstrap server comprises a first module 91 for setting up a Datagram Transport Layer Security, DTLS, connection or a Transport Layer Security, TLS with the client device. The first module 91 may, for instance, comprise an interface device and/or a protocol (e.g. interface 63 described with reference to FIG. 7), and/or processing circuitry adapted to send/receive messages to/from the client device.

The bootstrap server comprises a second module 92 for performing a bootstrapping procedure with the client device. Such second module 92 may comprise processing circuitry adapted for such bootstrapping procedure, and/or an interface device.

The bootstrap server comprises a third module 93 for setting up one of a DTLS and a TLS connection to the server device using an identity of the client device. Such third module 93 may, for instance, comprise an interface device and/or processing circuitry adapted to such setting up one of the DTLS and TLS connection using the identity of the client device.

The bootstrap server comprises a fourth module 94 for indicating, to the server device desire to use one of DTLS and TLS session resumption, and receiving a session ticket in response. Such fourth module 94 may, for instance, comprise processing circuitry adapted for such indication and receiving circuitry for receiving such session ticket in response.

The bootstrap server comprises a fifth module 95 for sending, to the client device the session ticket and a session key, enabling the client device to set up the connection to the server device as one of a DTLS and TLS session resumption. Such fifth module 95 may, for instance, comprise transmitting circuitry.

It is noted that one or more of the modules 91, 92, 93, 94 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a client device for setting up a connection with a server device, the client device and the server device supporting a Light Weight Machine to Machine, LWM2M protocol, the method comprising:
   setting up a Datagram Transport Layer Security, DTLS, or Transport Layer Security, TLS, connection with a bootstrap server,
   performing a bootstrapping procedure with the bootstrap server, comprising generating a temporary identity of the client device, and indicating, during the bootstrapping procedure, that the bootstrap server is to set up the DTLS or TLS connection to the server device on behalf of the client device, wherein the indicating comprises delegating the generated temporary identity of the client device to the bootstrap server,
   receiving, from the bootstrap server, a session ticket and a session key, and
   setting up the connection to the server device as a DTLS or TLS session resumption procedure using the received session ticket and session key.

2. A computer program product for a client device for setting up a connection with a server device, the computer program product comprising a non-transitory computer readable medium storing computer program code, which, when executed on at least one processor on the client device causes the client device to perform the method according to claim 1.

3. A client device for setting up a connection with a server device, the client device and the server device supporting a Light Weight Machine to Machine, LWM2M protocol, the client device is configured to:
   set up a Datagram Transport Layer Security, DTLS, or Transport Layer Security, TLS, connection with a bootstrap server,
   perform a bootstrapping procedure with the bootstrap server, comprising generating a temporary identity of the client device, and indicating, during the bootstrapping procedure, that the bootstrap server is to set up the DTLS or TLS connection to the server device on behalf of the client device, wherein the indicating comprises delegating the generated temporary identity of the client device to the bootstrap server,
   receive, from the bootstrap server, a session ticket and a session key, and
   set up the connection to the server device as a DTLS or TLS session resumption procedure using the received session ticket and session key.

4. A method performed in a bootstrap server for enabling setting up of a connection between a client device and a server device, the client device and the server device supporting a Light Weight Machine to Machine, LWM2M protocol, the method comprising:
   setting up a Datagram Transport Layer Security, DTLS, connection or Transport Layer Security, TLS with the client device,
   performing a bootstrapping procedure with the client device, comprising receiving, during the bootstrapping procedure, an indication that the bootstrap server is to set up the DTLS or TLS connection to the server device on behalf of the client device,
   setting up a DTLS or TLS connection to the server device using an identity of the client device, wherein the identity of the client device comprises a temporary identity usable only for delegation and acquiring a DTLS or TLS session resumption ticket,
   indicating, to the server device desire to use a DTLS or TLS session resumption, and receiving a session ticket in response, and
   sending, to the client device the session ticket and a session key, enabling the client device to set up the connection to the server device as a DTLS or TLS session resumption.

5. A computer program product for a bootstrap server for enabling setting up of a connection between a client device and a server device, the computer program product comprising a non-transitory computer readable medium storing computer program code, which, when executed on at least one processor on the bootstrap server causes the bootstrap server to perform the method according to claim 4.

6. A bootstrap server for enabling setting up of a connection between a client device and a server device, the client device and the server device supporting a Light Weight Machine to Machine, LWM2M protocol, the bootstrap server being configured to:
   set up a Datagram Transport Layer Security, DTLS, connection or Transport Layer Security, TLS with the client device,
   perform a bootstrapping procedure with the client device, comprising receiving, during the bootstrapping procedure, an indication that the bootstrap server is to set up the DTLS or TLS connection to the server device on behalf of the client device,
   set up a DTLS or TLS connection to the server using an identity of the client device, wherein the identity of the client device comprises a temporary identity usable only for delegation and acquiring a DTLS or TLS session resumption ticket, indicate, to the server device desire to use a DTLS or TLS session resumption, and receiving a session ticket in response, and send, to the client device the session ticket and a session key, enabling the client device to set up the connection to the server device as a DTLS or TLS session resumption.

\* \* \* \* \*